United States Patent [19]

LaBarge et al.

[11] Patent Number: 4,952,413
[45] Date of Patent: Aug. 28, 1990

[54] SUGARLESS OR FAT FREE FOOD COMPOSITIONS

[75] Inventors: Robert G. LaBarge, Midland, Mich.; Clyde E. Baxter, Jr., Palm Bay, Fla.; Jimmie D. Christen, Lake Jackson, Tex.; Abraham I. Bakal, Parsippany, N.J.

[73] Assignee: The Dow Chemical Company, Midland, Mich.

[21] Appl. No.: 394,262

[22] Filed: Jul. 26, 1989

Related U.S. Application Data

[63] Continuation of Ser. No. 883,191, Jul. 8, 1986, abandoned, which is a continuation-in-part of Ser. No. 861,784, May 9, 1986, abandoned, which is a continuation-in-part of Ser. No. 675,035, Nov. 26, 1984, abandoned.

[51] Int. Cl.$^5$ ................................................ A23L 1/00
[52] U.S. Cl. ............................................ 426/6; 426/548; 426/603; 426/804
[58] Field of Search ................ 426/548, 648, 443, 804, 426/570, 603, 631, 549, 3, 6

[56] References Cited

U.S. PATENT DOCUMENTS

| | | | |
|---|---|---|---|
| 2,784,100 | 3/1957 | Endicott | 426/548 |
| 2,845,353 | 7/1958 | Riffkin | 426/548 |
| 2,889,226 | 6/1959 | Henkley | 426/548 |
| 3,173,797 | 3/1965 | Lowey | 426/548 |
| 3,329,508 | 7/1967 | Freedman et al. | 426/548 |
| 3,766,165 | 10/1973 | Rennhard | 426/548 |
| 3,876,794 | 4/1975 | Rennhard | 426/152 |
| 4,005,195 | 1/1977 | Jandacek | 426/658 |
| 4,005,196 | 1/1977 | Jandacek | 514/558 |
| 4,034,083 | 7/1977 | Mattson | 514/558 |
| 4,157,402 | 6/1979 | Ogawa et al. | 426/103 |
| 4,452,821 | 6/1984 | Gergely | 426/5 |
| 4,744,988 | 5/1988 | Brox | 426/5 |

OTHER PUBLICATIONS

Mark et al., 1967 Encyclopedia of Polymer Science and Technology, vol. 6, pp. 103–109 and 140–143, Interscience Publishers New York.

Chem. Abstracts 90:70655z Torazzo et al., Ind. Aliment. 1978 17(11)831.

21 CRF 172.820.

Furia 1972 CRC Handbook of Food Additives, vol. I, second edition, pp. 432–433, CRC Press Ohio.

*Primary Examiner*—Carolyn Paden

[57] ABSTRACT

Food compositions are substantially sugar or fat-free, comprise a texturizing amount of a polyalkylene oxide polymeric composition, and have a texture substantially similar to food compositions containing sugar or fat.

17 Claims, No Drawings

SUGARLESS OR FAT FREE FOOD COMPOSITIONS

This application is a continuation of U.S. Application Ser. No. 883,191 filed on July 8, 1986, now abandoned, which is a continuation-in-part of U.S. application Ser. No. 861,784 filed on May 9, 1986, now abandoned, which is a continuation-in-part of U.S. application Ser. No. 675,035 filed on Nov. 26, 1984, now abandoned.

BACKGROUND OF THE INVENTION

The present invention concerns food compositions containing a non-caloric filling agent.

The desirability of providing low calorie food for those who wish to control their tendency to be overweight is well known and various low calorie food products have been prepared and offered for sale. Inasmuch as common sugar (sucrose) is high in calories and its sweetening effect can be obtained with relatively low calorie artificial sweeteners such as saccharin, many products have been offered which are sugar-free, the sweetening effect being obtained with an artificial sweetener. However, in the case of many foods, sucrose cannot be replaced with a low volume, high intensity sweetening agent because the sugar performs other essential functions, such as providing bulk in the food. Accordingly, various low calorie, alginates, gelatins, gum carrageenans and the like have been used to replace the bulk normally provided by sugar. Replacement of sugar with these gums is not always effective because the finished food product is lacking in certain physical properties which are required, such as texture, mouth-feel and appearance.

Another method of reducing the caloric content of foods is to reduce the fat content of foods. Fats provide tenderness, texture and satiety value in many food compositions. In baked goods and frostings, the fats readily entrap air during mixing to aid in the leavening process and fluffiness. Unfortunately, fats typically exhibit 9 calories per gram.

Numerous references have disclosed the desirability of providing improved sweetening compositions. (See, for example, U.S. Pat. Nos. 3,876,794; 3,766,165; 3,737,322; 3,329,508; and 2,784,100.) However, such compositions find use in limited applications.

It would be highly desirable to have a method for replacing sugar or fat of food compositions with a filler which is non-digestible, water-soluble, non-toxic, and which substantially provides to the foods physical properties, such as texture and mouth-feel, similar to such properties provided by sugar or fat.

SUMMARY OF THE INVENTION

The present invention is a normally texturized, substantially sugarless or fat-free food composition comprising a texturizing amount of a polyalkylene oxide polymeric composition. The food composition substantially resembles in appearance and mouth-feel a sugar- or fat-containing food composition.

In another aspect, this invention is a method for preparing a normally texturized, substantially sugarless or fat-free food composition. The method comprises admixing a texturizing amount of a polyalkylene oxide polymeric composition to food ingredients, and subjecting the composition and ingredients to suitable preparation conditions.

In yet another aspect, the present invention is a method for providing bulk properties to a low calorie sugar substitute composition which comprises contacting said sugar substitute composition with at least 90 weight percent of a solid polyalkylene oxide polymer, which amount provides bulk-fill properties to the composition and which polyalkylene oxide polymer is essentially non-toxic, non-digestible, water-soluble and provides a solid character to the composition. Such a bulk-filled low calorie sugar substitute can be employed in a food composition as a replacement for the sweetening and bulking functions of sugar.

A further aspect of the present invention concerns a process for preparing a low calorie sweetening composition which comprises:

reacting an alkylene oxide with an initiator in the presence of a catalyst to form, as the first component, a solid polyalkylene oxide polymer; wherein said polymer is essentially non-toxic, non-digestible, water-soluble and provides a solid character to the composition;

comingling, as the second component, a low calorie sugar substitute; and having said first component present in at least 90 weight percent to provide bulk-fill properties to the composition.

Surprisingly, this invention provides a method for replacing the sugar or fat of food compositions with a filler which is non-digestible, water-soluble, non-toxic, and substantially provides to foods physical properties such as texture, volume and mouth-feel similar to such properties provided by sugar or fat. In two texturizing functions, the polymeric composition can be employed as a sugar substitute, or a fat substitute, or both a sugar and fat substitute. Preferably, the polymeric composition is a fat substitute. Surprisingly, the polymeric composition substantially mimics the filling and texturizing properties of sugar and fats.

The methods and compositions of this invention provide the skilled artisan methods for using low calorie sugar substitutes in many applications in which sugar has been employed. Of particular interest are those sweetening compositions in which the polyalkylene oxide polymer provides a crystalline character to said composition. Of particular interest are those applications where the bulk properties of a sweetening agent such as sugar are desirable. For example, compositions of this invention are useful in preparing certain candies, cookies, cakes, ice cream and other foods.

DETAILED DESCRIPTION OF THE INVENTION

As used herein, the term "non-digestible" refers to a substance which provides little or no caloric value. By the term "low calorie sugar substitute" is meant, that the sugar substitute contains less than about 1 calorie per gram, preferably about 0 calorie per gram, of the sugar substitute. By the term "crystalline character" is meant a crystalline character which provides sensory properties, such as mouth-feel, volume and texture, similar to that of sucrose. By the term "non-toxic" is meant a substance which is safe for human consumption. One measure of such safety can be approval for sale by the appropriate government agency. The term "normally texturized" means the physical appearance, volume and structure of the food as it is typically prepared with sugar or fat. For example, a cake prepared using the polymeric composition of the invention will have substantially the normal texture of a cake prepared with sugar and/or fat. Likewise, with other food compositions such as cookies, candies, ice creams, frostings, margarines, etc., the foods employing the polymeric composition resemble such foods as if prepared with sugar or fat. The term "substantially sugarless" means that an amount of sugar has been removed to provide a significant reduction in calories. A significant reduction in calories is a reduction of at least 10 percent. Such a reduction can be achieved by replacing at least 30 weight percent of the typical amount of sugar with the polymeric composition. The term "substantially fat-free" means that an amount of the fat has been removed to provide a significant reduction in calories. A significant reduction in calories is a reduction of at least 10 percent. Such a reduction can be achieved by replacing at least 30 weight percent of the typical amount of fat with the polymeric composition.

For purposes of this invention, the water-soluble polymer is one which forms a thermodynamically stable mixture when combined with water. It is most desirable that the mixture forms spontaneously and includes true solutions in which the individual polymer molecules are dispersed as well as micellar or colloidal solutions in which the molecules can be aggregated to some extent, but wherein such aggregates are no larger than colloidal size. Preferably, by the term "water-soluble" is meant that the polyalkylene oxide polymer exhibits a high solubility in water similar to that of sucrose.

Low calorie sugar substitutes are those commonly known sweeteners such as saccharin, both the D- and L-isomers of carboxylic acid salts of aspartame, aspartame, cyclamates, acesulfame K, glycyrrhizin, thaumatin, stevioside, chloroderivatives of sucrose (e.g., trichlorogalactosucrose), dihydrochalcones, L-sugars, monellin, miraculin, the sweetening agents disclosed in European Patent Application 48051 and French Patent No. 2,533,210, and the like. Both nutritive and non-nutritive low calorie sugar substitutes can be employed. Most preferably, the low calorie sugar substitute is the D- or L-isomers of aspartame (which is commonly prepared from the amino acids L-aspartic acid and L-phenylalanine), and the carboxylic acid salts of aspartame. The D-isomer and salts of aspartame can exhibit heat stability.

The polymeric compositions useful in this invention comprise a polyalkylene oxide polymer or a mixture of such polymers. Typically, the various polymers are prepared by polymerizing various alkylene oxides onto various initiators containing active hydrogens. The reaction is carried out in the presence of either an acidic or basic catalyst, for example NaOH. A further discussion of the reaction to prepare the polyalkylene oxide polymer of this invention can be found in *Polyurethanes Chemistry and Technology* by J. H. Saunders and K. C. Frish, Pub. John Wiley & Sons, N.Y., pgs. 33-37, and in *Glycols* by G. O. Curme, Jr., and F. Johnston, Pub. Reinhold, N.Y. (1952), and in several U.S. Patents. Examples of alkylene oxides include ethylene oxide, propylene oxide and butylene oxide, preferably ethylene oxide. Copolymers of the alkylene oxides are also included.

Examples of suitable initiators for preparing the polymers include water, ethylene glycols, propylene glycols, butylene glycols, glycerine, pentaerythritol, sucrose, sorbitol, fructose, mannitol, glucose, cellulose, numerous multifunctional alcohols, the amines, and any compound containing a functionality which can contain at least one active hydrogen. Particularly preferred initiators are diethylene glycol, glycerine, sucrose and water. See, for example, the monahls and polyahls disclosed in U.S. Pat. No. 4,477,603.

Equivalent weights of the polymers useful in this invention can vary. Typically, the weights are such that at 20° C. a solid polymer results, and preferably are such that the polymer is large enough to be substantially non-absorbable, or non-digestible. Typically, such weights are greater than about 800, preferably between about 1,000 and about 100,000, and more preferably between about 1,000 and about 10,000. It is understood that polymers having molecular weights up to several million can be useful in some instances. When functioning as a bulk-filling sugar-replacer, such polymers are most preferably employed in a powder or crystalline form. The melting point of the polymer is typically lower for the lower molecular weight polymers. When functioning as a texturizing fat-replacer, it can be advantageous to employ a polymer which is a solid at 20° C., but which exhibits a melting point of about 37° C. Polyalkylene oxide polymers which are substantially non-thickening when combined with water and provide substantially no laxative effect to humans are particularly preferred. Examples of preferred polyalkylene oxide polymers include polyethylene oxides, such as polyethylene glycol (i.e., PEG); and mixtures of polyethylene oxides and polypropylene oxides.

The amount of sugar substitute relative to the polyalkylene oxide polymer can vary depending upon factors such as the sweetness of the sugar substitute, the type and molecular weight of the polyalkylene oxide polymer, the desired physical (e.g., texture, solid or crystalline) properties of the food composition, and the like. Typically, the amount of sugar substitute varies from about 0.001 to about 10, preferably from about 0.05 to about 1 weight percent based on the total weight of sweetener and polymer; while the amount of polyalkylene oxide polymer varies from about 90 to about 99.999, preferably from about 99.95 to about 99 weight percent based on the total weight of sweetener and polymer. The manner of mixing the components is not particularly critical. For example, the components can be dry blended.

The amount of polymeric composition employed in preparing food or foodstuff compositions according to this invention is a texturizing amount. Such an amount is sufficient to provide the texture, and/or volume and preferably the mouth-feel, which the food composition would exhibit if prepared with sugar and/or fat. Typically, the polymeric composition can be substituted for the sugar and/or fat on an equal weight basis. For example, one gram of polymeric composition can replace one gram of sugar and/or fat. When employing the polymeric composition along with the low calorie sugar substitute as a mixture, the mixture is employed in an amount sufficient to provide substantially similar sweetness and texture which the food composition would exhibit if prepared with sugar and/or fat.

Food ingredients which are employed along with the polymeric composition of this invention include flavorings, flours, fiber sources, and the like. Of course, the particular ingredients will vary according to the particular food composition to be prepared. For example, the ingredients employed in preparing a cake will be different from those employed in making a candy.

A low calorie, substantially sugarless or fat-free baked goods food composition can be prepared by employing a texturizing amount of the polyalkylene oxide polymeric composition. The polyalkylene oxide polymeric composition can replace a large amount of the sugar and function as an emulsifier so that an amount of the shortening and eggs can be reduced. Typically, baked goods are prepared from batter compositions comprising a flour, a shortening, an emulsifier, leavening agents and moisturizing agents. Flours which can be employed in practicing this invention include whole wheat, soft wheat, all purpose and enriched flours. Shortenings which can be employed in practicing this invention include animal or vegetable oil, coconut oil, palm kernel oil, cottonseed oil, peanut oil, olive oil, sunflower seed oil, sesame oil, corn oil, safflower oil, poppyseed oil, soybean oil, yogurt, and oils which are synthesized from natural or synthetic fatty acids. Leavening agents which can be employed include edible carbon dioxide-producing salts such as carbonate and bicarbonate salts (i.e., sodium carbonate, sodium bicarbonate, potassium carbonate and potassium bicarbonate). Baking soda and baking powder can also be employed. Moisturizing agents include milk and water. Additionally, the batter compositions can be comprised of a flavoring agent.

The components of the baked goods batter composition are employed in functionally effective amounts. The flour is employed in a matrix forming amount. Such an amount is sufficient to form a solid cellular matrix upon baking. Typically, such amount can range from about 20 to about 40, preferably from about 25 to about 30 weight percent. The shortening aids in the cell-forming of the flour. Typically, the shortening is employed from about 7 to about 15; preferably from about 8 to about 10 weight percent. The emulsifier is employed in an amount sufficient to stabilize the dispersion of shortening throughout the aqueous phase. Such emulsifiers are preferably included in the shortening itself. The leavening agents are employed in a leavening amount, i.e., an amount sufficient to cause the formation of the cells for the flour matrix structure. Such an amount typically ranges from about 0.3 to about 1.5, preferably from about 0.6 to about 0.9 weight percent. The moisturizing agent is employed in a moisturizing amount. Such an amount can range from about 8 to about 25, preferably from about 9 to about 15 weight percent. The polyalkylene oxide polymer is employed in a bulk filling amount. Such an amount provides a volume to the baked good within 30 percent of the volume, preferably within 20 percent of the volume of a baked good prepared with sugar. Such an amount ranges from about 10 to about 35, preferably from about 13 to about 30 weight percent.

The components of the baked good can be prepared in any convenient manner. It can be advantageous to first solubilize the water-soluble polyalkylene oxide polymer in water. The remaining components can be mixed together to provide the batter composition, which can then be cooked or baked to provide a substantially sugarless, bulk-filled and, preferably, normally texturized baked good. The baked goods prepared via the methods of this invention can exhibit at least 20 percent, preferably at least 30 percent, and more preferably at least 40 percent reduction in calories over a baked good prepared employing a bulk-filling amount of sugar.

In another aspect, a low calorie, substantially sugarless, frozen dessert, such as an ice cream-type food, can be prepared by employing a texturizing and, preferably, a bulk-filling amount of the polyalkylene oxide polymeric composition. The polymeric composition can be employed as a powder or as a syrup. It can also be advantageous to employ a secondary filler, such as a synthetic gum, preferably polydextrose along with the polymeric composition. Other gums which can be employed are cellulose ethers such as hydroxypropyl methylcellulose, and natural gums such as gum carrageenan. The texturizing and bulk-filling amount is typically equivalent to the amount of sugar which is replaced (i.e., for every gram of sugar removed, one gram of polymer or polymeric composition is added). Such an amount can range from about 10 to about 25, and preferably from about 17 to 22 weight percent. Other components of the dessert include an amount of cream to provide creamy character, an amount of non-fat milk to aid in the creamy character, an amount of water to provide a homogeneous emulsion, a sweetening amount of a sweetening sugar substitute; and a flavoring amount of a flavoring composition.

The dessert can be prepared by conventional means such as mixing, pasteurizing, homogenizing, cooling and freezing. Preferably, the flavor and sweetener are added after the cooling step. The frozen desserts prepared employing the polyalkylene oxide polymer exhibit a texture, volume, appearance and mouth-feel of a dessert prepared employing sugar. The dessert can also exhibit a calorie reduction of at least 15, preferably at least 25, and more preferably at least 35 percent on a comparable weight basis.

In yet another aspect, a reduced calorie, substantially sugarless and fat-free whipped topping, can be prepared by employing a texturizing and preferably a bulk-filling amount of the polyalkylene oxide polymeric composition. The whipped topping is primarily an oil-in-water emulsion comprised of an oil, thickeners, emulsifiers, water, a sweetening sugar substitute and the bulk-filling fat replacing polymeric composition. Suitable oils include hydrogenated vegetable oil, and the oil is employed in an amount to provide creamy character. Such amount typically ranges from about 25 to about 40, preferably about 29 to about 33 weight percent. Suitable thickeners include cellulose ethers such as carboxymethylcellulose, natural gums such as gum carrageenan, and are employed in a thickening amount. Such amount typically ranges from about 0.2 to about 4, preferably from about 0.5 to 3 weight percent. The thickener can be a composition of more than one separate thickener. Protein sources, such as sodium caseinate can be employed. Suitable emulsifiers are food approved emulsifiers such as lecithin, Span 60 and Tween 60, and are employed in an emulsifying amount. Such amount typically ranges from about 0.1 to about 0.5, preferably from about 0.1 to about 0.3 weight percent. More than one emulsifier can be employed in the topping. Water is employed in an amount sufficient to provide a continuous phase. Such amount typically ranges from about 40 to about 75, preferably from about 50 to about 60 weight percent. The sweetener is employed in a sweetening amount. Such amount is determined by the sweetening intensity of the sweetener compared to sugar. Such relative intensities are known. The texturizing and bulk-filling amount of the polymeric composition can be determined based on about an equal weight basis of sugar and other fat which was removed.

The topping can be prepared according to conventional methods, such as mixing, homogenizing, cooling and whipping. The whipped toppings of this invention can exhibit at least a 10 percent, preferably at least a 25 percent, more preferably at least a 50 percent, and most preferably at least a 60 percent reduction in calories compared to a topping prepared with a filling amount of sugar.

In still yet another aspect, a low calorie, substantially fat-free, spread food composition, such as a margarine or salad dressing, can be prepared by employing a texturizing amount of the polyalkylene oxide polymeric composition. The polymeric composition partially replaces the fat. The spread is either an oil-in-water or a water-in-oil emulsion and is comprised of a calorie-reducing, filling and texturizing amount of the polymeric composition. An amount of water or oil sufficient to provide a dispersed phase, and an amount of oil or water sufficient to provide a continuous phase are also employed. Optionally, an emulsifying amount of an emulsifier and a flavoring amount of a flavoring can also be employed. Suitable flavorings for salad dressings include edible acids. Also a thickener can be employed. Suitable oils, emulsifiers, flavorings, and thickeners are described above. Typically, the polymeric composition is employed from about 10 to about 60, preferably from about 20 to about 50 weight percent; the water is employed from about 10 to about 40; preferably from about 15 to about 30 weight percent; and the hydrogenated oil is employed from about 15 to about 45, preferably from about 20 to about 30 weight percent.

The spreads are prepared by mixing the ingredients, homogenizing and then cooling. The spreads of this invention can exhibit at least a 50 percent, and preferably at least 60 percent reduction in calories compared against conventially prepared spreads (i.e., spreads which contain an amount of oil instead of polyalkylene oxide polymer).

In another aspect, a low calorie, substantially sugarless chewing gum can be prepared by employing a texturizing amount of the polyalkylene oxide polymeric composition. The polymeric composition can partially replace the texturizing functions provided by sugar and a plasticizer. Typically, chewing gums are comprised of a gum base, a sweetener, plasticizer, emulsifiers and flavorings.

The gum base can be prepared by heating and blending various ingredients, such as natural gums, synthetic resins, waxes, plasticizers, etc., in a manner well known in the art. Typical examples of the ingredients found in a chewing gum base are masticatory substances of synthetic origin such as styrene-butadiene copolymers, isobutylene-isoprene copolymers, polyisobutylene polymers, polyethylene polymers, petroleum wax, polyvinyl acetate polymers, as well as masticatory substances of natural origin such as rubber latex solids, chicle, crown gum, nispero, rosidinha, jelutong, pendare, perillo, niger gutta, tunu, etc. The elastomer or masticatory substance can be employed in an amount within the range of about 5 to about 15 percent, preferably from about 8 to about 12 percent and optimally from about 9 to about 11 percent by weight of the gum base composition.

In addition, the gum base can preferably contain a solvent for the elastomer which should have minimal tackifying properties and can preferably comprise hydrogenated ester gum, such as glycerol ester of hydrogenated rosin and/or dimerized ester gum.

Other conventional ingredients which can be present in the gum base include a hydrophilic-type detackifier which can sorb saliva and become slippery and can be incompatible with the elastomer and solvent for the elastomer, such as polyvinyl acetate, polyvinyl butyl ether, copolymers of vinyl esters and vinyl ethers.

The gum base can also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax and the like.

The gum base can also include a softening agent and lubricant combination which can comprise one or more hydrogenated vegetable or animal fats having a high melting point, that is, above about 22° C.

The gum base can also include an emulsifier to impart hydrophilic properties to the gum base so that saliva will be absorbed, thereby making the gum base slippery. Examples of such emulsifiers include glyceryl monostearate, phosphatides, such as lecithin and cephalin, Tweens, Spans and mixtures thereof.

In addition, the gum base can include colorants such as titanium dioxide, plasticizers, such as lanolin, stearic acid, sodium stearate, potassium stearate and the like, antioxidants, in an amount up to about 1,000 ppm of the gum base, such as butylated hydroxytoluene, butylated hydroxyanisole, and/or propyl gallate.

The gum base can in addition include secondary bulking agents separate from the polyalkylene oxide polymeric composition. Such secondary bulking agents can be employed in amounts ranging from about 10 to about 50 percent by weight of the gum base portion. Examples of secondary bulking agents suitable for use in the gum base include, but are not limited to calcium carbonate, aluminum hydroxide, alumina, magnesium carbonate, talc ($3MgO.4SiO_2.H_2O$), aluminum silicates, Cab-0-Sil, chalk, and combinations thereof. When chalk is used as a bulking agent, the normally acidic lactose--hydrolyzed whey or lactose-hydrolyzed whey fraction is neutralized by an alkali such as sodium hydroxide. Examples of typical gum bases suitable for use herein are disclosed in U.S. Pat. Nos. 2,197,719, and 3,052,552.

The gum base can be present in the finished chewing gum product in an amount within the range of from about 10 to about 40 percent, and preferably from about 20 to about 25 percent by weight.

The gums contain an amount of a sweetener composition. The composition is comprised of an intense sweetener, as described above, and an optional secondary texturizing component such as xylitol, sorbitol, mannitol and/or other sugar alcohols. Such sugar alcohols are employed in a minor amount because they can contribute calories to the gums.

The gums further contain a flavoring oil which can also act as a plasticizer. A flavoring can also be sprayed onto the gum to provide an initial flavor impact. Typically, the flavor oil is employed in the range of 0.5 to 1.5 weight percent.

According to this invention, the polyalkylene oxide polymeric composition replaces part of the gum base, on an equal weight basis and can function as a texturizer and as a plasticizer. Surprisingly, gums which employ aspartame as a sweetener can be prepared without water, and thus their shelf stability is greatly improved.

The gums are prepared by melting the gum base, adding the other ingredients, mixing, rolling, tempering and scoring the mixture. The gums exhibit physical texture, mouth-feel and appearance of gums prepared with sugar or sugar alcohols, and the gums of this invention can exhibit zero calories.

In another aspect, a low-calorie, substantially fat-free chocolate can be prepared by employing a texturizing amount of the polyalkylene oxide polymeric composition. It can be advantageous to employ a polymer which exhibits a melting point of about body temperature, (i.e., 37° C.). Typically, the chocolate is comprised of a flavoring amount of cocoa, an emulsifying amount of an emulsifier, a sweetening amount of a sugar or a sugar substitute and a creaming amount of a creamer. Suitable emulsifiers and sugar substitutes are described above. Suitable creamers include non-fat dry milk.

The texturizing amount of the polymeric composition can range from about 20 to about 50, preferably from about 30 to about 40 weight percent. The flavoring amount of cocoa can range from about 10 to about 25, preferably from about 15 to about 20 weight percent. The sweetening amount of sugar can range from about 15 to about 30, preferably from about 17 to about 20 weight percent. If a sugar substitute is employed, it is employed in an amount based on its sugar-equivalent sweetening value. The creaming amount of a creamer can range from about 10 to about 20, preferably from about 12 to about 17 weight percent. The emulsifiers and any additional flavors are typically added in amounts less than 1 weight percent.

The chocolate of this invention can be prepared by melting and blending the polymeric composition, cocoa and emulsifier, followed by the addition of the remaining ingredients as a dry blend. The mixture is ground until it is smooth. Smoother and higher quality chocolate can be prepared by subjecting the mixture to a large amount of grinding. The mixture is then cooled to provide the chocolate.

Other foods and food compositions with reduced caloric content and substantially similar texture to sugar and/or fat prepared foods can be prepared by employing the polymeric composition as a sugar and/or fat replacer.

The following examples illustrate the present invention but are not intended to limit the scope.

EXAMPLE 1 - GUM FOOD COMPOSITION

Zero calorie chewing gums are prepared according to the following composition:

| Ingredients | Samples (Weight Percent) | | |
|---|---|---|---|
| | A | B | C |
| Filler-free gum base | 48.3 | 48.3 | 48.1 |
| Chalk | — | 10.0 | 10.0 |
| Talc | 10.0 | — | — |
| Flavor oil | 1.0 | 1.0 | 1.0 |
| Sodium saccharin | 0.1 | 0.1 | — |
| Polyethylene glycol Mw 3350 | 40.0 | 40.0 | 40.0 |
| Spray dried flavor | 0.5 | 0.5 | 0.5 |
| Citric acid | 0.1 | — | — |
| Aspartame | — | — | 0.3 |

The gum base is melted and cooled to 150° F. in a Sigma mixer. The filler (chalk or talc) is then added and the gum base is cooled to 135° F. Next, the texturizing amount of polyethylene glycol is added slowly while mixing; then the sweetener is added along with the flavor and remaining polyethylene glycol and mixed for 5 minutes until uniform. The mixture is then removed from the kettle, rolled, tempered and scored.

Sample A illustrates a fruit flavored gum, Sample B a mint flavored, saccharin-sweetened gum and Sample C a mint flavored aspartame-sweetened gum.

The gums exhibit the physical texture and appearance of sugar or sugar alcohol prepared gums, and have a soft initial chew and a firm chew during mastication. Also, all have substantially zero calories.

EXAMPLE 2 - GUM FOOD COMPOSITION

Sugarless, moisture-free gums were prepared as follows:

| Ingredient | Samples (Weight Percent) | | |
|---|---|---|---|
| | D | E | F |
| Filler-free gum base | 23.0 | 21.0 | 23.0 |
| Chalk | — | 3.0 | — |
| Polyethylene glycol Mw 3350 | 20.0 | 20.0 | 20.0 |
| Mannitol | 10.0 | 10.0 | 10.0 |
| Sorbitol | 45.7 | 44.7 | 45.5 |
| Flavor | 1.2 | 1.2 | 1.2 |
| Saccharin | 0.1 | 0.1 | — |
| Aspartame | — | — | 0.3 |

The gum base is melted in a Sigma mixer. It is cooled to 150° F., then the mannitol, sorbitol powder and filler are added while mixing. The flavor and sweetener are added and the texturizing amount of polyethylene glycol is added slowly to produce a uniform mass. The gum is removed from the kettle, rolled, tempered and scored. The resulting chewing gums have a soft initial chew and excellent chew properties during mastication. The gums are highly stable and are moisture free. The aspartame-containing gum (Sample F) shows no loss of sweetness during processing and after considerable storage. These gums are reduced in calories since polyethylene glycol has zero calories.

EXAMPLE 3 - WHIPPED TOPPING FOOD COMPOSITION

A sugar-free whipped topping is prepared employing the following ingredients.

| Ingredients | Weight Percent |
|---|---|
| Hydrogenated vegetable oil | 30.00 |
| Sodium caseinate | 3.00 |
| CMC 7HF (carboxymethyl cellulose) | 0.50 |
| Span 60 | 0.24 |
| Tween 60 | 0.16 |
| Disodium phosphate | 0.05 |
| Water | 58.03 |
| Polyethylene glycol Mw 3350 | 8.00 |
| Sodium saccharin | 0.02 |

All ingredients, except the oil and emulsifiers, are dry blended and added into the water. The oil is melted and the emulsifiers are added. The water and fat phase mixture is then added into a mixer, heated to 160° F with agitation, homogenized at 2,000 psig, cooled to 40° F and whipped.

The resulting product has the physical texture and creaminess of a whipped topping employing sugar and fat, and has about 280 calories per 100 grams and contains no sugar.

EXAMPLE 4 - BAKED GOODS FOOD COMPOSITION

A cake is prepared employing the following ingredients:

| Ingredients | Weight Percent |
|---|---|
| Flour (all purpose) | 26.4 |
| Salt | 0.3 |
| Baking powder | 0.8 |
| Butter | 8.0 |
| Sugar | 15.0 |
| Eggs | 19.1 |
| Vanilla extract | 0.5 |
| Non-fat milk solids | 1.3 |
| Water | 14.1 |
| Polyethylene glycol Mw 3350 | 14.5 |

The salt, baking powder, butter, sugar, vanilla extract, and non-fat milk solids are mixed together to provide a creamed mixture. The texturizing and bulk-filling amount of polyethylene glycol is solubilized in the water to provide a syrup. The flour is added to the creamed mixture and then the polyethylene glycol syrup is added. The ingredients are mixed to provide a batter. The batter is baked in pans at 350° F. for 60 minutes. The cake has a moisture content of 24.7 percent after baking.

This product has a physical texture and mouth-feel of a cake prepared with a normal amount of sugar. It has 1.2 times the volume of a sugar cake and has an approximate caloric value of 260 calories per 100 grams.

EXAMPLE 5 - NON-FLAVORED SPREAD FOOD COMPOSITION

Low-calorie, margarine-like spreads are prepared employing the following ingredients:

| Ingredients | Samples (Weight Percent) A | B |
|---|---|---|
| Water | 20.0 | 20.0 |
| Lecithin (emulsifier) | 0.5 | 0.5 |
| Mono and diglycerides (emulsifiers) | 1.0 | 1.0 |
| Hydrogenated Oils | 40.0 | 30.0 |
| Polyethylene glycol Mw 3350 | 38.5 | 48.5 |

Both samples are prepared by mixing the water with the oil, emulsifiers and texturizing amount of polyethylene glycol. The mixture is homogenized at 2,000 psig; and then cooled to 40° F. while mixing. The final product has a margarine-like texture.

Sample A has approximately 380 calories per 100 grams, while Sample B has 290 calories per 100 grams.

EXAMPLE 6 - FROZEN DESSERT COMPOSITION

A low calorie frozen dessert is prepared using the following formulation:

| Ingredients | Percent |
|---|---|
| Cream (36 percent fat) | 20.8 |
| Non-fat milk | 10.3 |
| Water | 46.3 |
| Carrageenan | 0.5 |
| Vanilla extract | 0.5 |
| Aspartame | 0.1 |
| Polyethylene glycol Mw 3350* | 21.4 |

*Added as 70 percent aqueous solution.

This product is prepared by combining all of the ingredients with the exception of the flavor and aspartame; pasteurizing the mixture to 160° F and maintaining it at this temperature for 30 minutes. The mixture is homogenized at 2,000 psig and rapidly cooked to 40° F. The flavor and aspartame are then added and the product is whipped, then frozen.

This product has the physical texture and mouth-feel of ice cream prepared with sugar and has an approximate caloric value of 108 calories per 100 grams.

EXAMPLE 7 - CHOCOLATE COMPOSITION

| Ingredients | Percent |
|---|---|
| Part A | |
| PEG $M_w$ 1470$^{(a)}$ | 37.5 |
| Chocolate liquor$^{(b)}$ | 24.0 |
| Lecithin | 0.5 |
| Part B | |
| Powdered 10X Sugar | 22.5 |
| Non-fat dry milk | 15.0 |
| Flavor | 0.5 |

$^{(a)}$Polyethylene glycol-molecular weight 1470.
$^{(b)}$An 18 weight percent chocolate in 6 weight percent water mixture.

The ingredients of Part A are melted and blended well. The ingredients of Part B are dry blended and then added to the ingredients of Part A. The mixture is ground with a mortar and pestle and then cooled to provide a chocolate.

The chocolate exhibits the texture and mouth-feel of a chocolate prepared with fat instead of the PEG.

What is claimed is:

1. A normally texturized, substantially sugarless or fat-free low-calorie foodstuff composition comprising having mixed therein a bulk texturizing amount of an essentially non-toxic, low-calorie polyalkylene oxide, having a molecular weight between about 800 and about 10,000, prepared from ethylene oxide, propylene oxide or butylene oxide or mixtures thereof in a concentration from about 8g/100g of the foodstuff composition which replaces at least thirty weight percent of sugar or fat in the foodstuff composition whereby an amount of sugar or fat has been removed to provide a reduction in calories of at least ten percent compared to a sugar or fat containing foodstuff composition.

2. The foodstuff composition according to claim 1, wherein the polyalkylene oxide has a molecular weight of about 1,000.

3. The foodstuff composition according to claim 1, wherein the polyalkylene oxide has a molecular weight between about 1,000 and about 10,000.

4. The foodstuff composition according to claim 1, wherein the polyalkylene oxide has a molecular weight of about 3,350.

5. The foodstuff product according to claim 1 in the form of a baked goods foodstuff.

6. The foodstuff product according to claim 1 in the form of a whipped topping.

7. The foodstuff product according to claim 1 in the form of a frozen dessert.

8. The foodstuff product according to claim 1 in the form of a spread foodstuff.

9. The foodstuff product according to claim 1 in the form of a chocolate.

10. The foodstuff product according to claim 1, wherein the polyalkylene oxide has a molecular weight between about 1,000 and about 10,000.

11. The foodstuff product according to claim 10 in the form of a baked goods foodstuff.

12. The foodstuff product according to claim 10 in the form of a whipped topping.

13. The foodstuff product according to claim 10 in the form of a frozen dessert.

14. The foodstuff product according to claim 10 in the form of a spread foodstuff.

15. The foodstuff product according to claim 10 in the form of a chocolate.

16. The foodstuff product according to claim 10, wherein the polyalkylene oxide is polyethylene glycol.

17. A normally texturized, substantially homogeneous sugarless or fat-free, low-calorie, digestible foodstuff product comprising having mixed therein a bulk texturizing amount of an essentially non-toxic, low-caloric polyethylene glycol, having a molecular weight between about 1,000 and 10,000, or mixtures thereof in a concentration from about 8g/100g of a foodstuff composition for the foodstuff product which replaces at least thirty weight percent of sugar or fat in the foodstuff composition whereby an amount of sugar or fat has been removed to provide a reduction in calories of at least ten percent compared to a sugar or fat containing foodstuff composition.

* * * * *